United States Patent [19]

Kochis

[11] Patent Number: 5,657,201
[45] Date of Patent: Aug. 12, 1997

[54] PORTABLE DATA COLLECTION TERMINAL INCLUDING ARM MOUNTING ASSEMBLY

[75] Inventor: Gary Kochis, Uniontown, Ohio

[73] Assignee: Teletransactions, Inc., Akron, Ohio

[21] Appl. No.: 554,076

[22] Filed: Nov. 6, 1995

[51] Int. Cl.[6] .................. G06F 1/16; H05K 7/10; H01R 33/00
[52] U.S. Cl. .................. 361/686; 224/219; 224/271; 224/903; 439/37; 439/909; 235/472
[58] Field of Search .................. 224/219, 221, 224/222, 267, 271, 272, 902, 903; 364/708.1; 439/37, 909, 350, 351, 928, 928.1, 929; 206/305; 235/472, 462, 470; 361/680–683, 686; 368/282

[56] References Cited

U.S. PATENT DOCUMENTS

| 4,136,805 | 1/1979 | Storms | 224/219 |
| 4,766,299 | 8/1988 | Tierney et al. | 235/472 |
| 4,768,648 | 9/1988 | Glass | 206/305 X |
| 5,183,193 | 2/1993 | Brandell | 224/219 |
| 5,191,197 | 3/1993 | Metlitsky et al. | 235/472 |
| 5,250,790 | 10/1993 | Melitsky et al. | 235/462 |
| 5,272,324 | 12/1993 | Blevins | 235/462 |
| 5,305,181 | 4/1994 | Schultz | 361/680 |
| 5,309,328 | 5/1994 | Lum | 224/267 X |
| 5,329,106 | 7/1994 | Hone et al. | 235/472 |
| 5,340,972 | 8/1994 | Sandor | 235/472 |
| 5,404,001 | 4/1995 | Bard et al. | 235/462 |

FOREIGN PATENT DOCUMENTS

2218895 11/1989 United Kingdom .................. 368/282

Primary Examiner—Michael W. Phillips

[57] ABSTRACT

A portable data collection terminal including an arm mounting assembly is disclosed. The terminal includes a terminal housing having a docking base protruding from its bottom surface. The docking base is configured to snugly fit in a recess defined by a thin docking member. The docking member is secured to a sleeve overlying an operator's forearm by a flexible strap. The strength of attachment between the terminal housing and the docking member is small enough to permit the terminal housing to release from the docking member if a sufficient force is applied to the terminal housing.

15 Claims, 6 Drawing Sheets

PORTABLE DATA COLLECTION TERMINAL INCLUDING ARM MOUNTING ASSEMBLY

TECHNICAL FIELD

The present invention relates to a portable data collection terminal including a mounting assembly to secure the terminal to an operator's arm and, more particularly, to a portable data collection terminal including an arm mounting assembly adapted to permit the terminal to break away from the operator's arm and a method of attaching a portable data collection terminal to an operator's arm.

BACKGROUND OF THE INVENTION

Portable data collection terminals are widely utilized in both service and manufacturing industries. Such portable data collection terminals are often linked to a central computer via a wireless cellular communication system utilizing spread spectrum communication techniques. The mobility of such a portable terminal permits it to be used for reading bar code dataforms at various locations within a facility, between facilities, and/or at remote job sites. A portable terminal may include a keyboard or keypad for inputting data manually. The terminal may also include a bar code dataform reader module for reading bar code dataforms. The cellular communication system facilitates transmission of data from the terminal to the central computer for updating one or more databases.

In retail stores, portable data collection terminals having bar code dataform reader modules may be advantageously employed to read bar code dataforms of products stocked on shelves to update inventory records. In warehouse or manufacturing facilities, portable data collection terminals may be used to read bar code dataforms affixed to raw material, work-in-process and/or finished goods inventory for production control, expediting and/or quality control purposes. In the package delivery industry, labels including bar code dataforms may be affixed to a package when received and portable data collection terminals may be utilized to read the bar code dataforms of packages passing through a shipper's various terminal for product tracking purposes. In a medical facility, a portable data collection terminal may be used by medical personnel to input and receive patient data at the point of patient service. Data collected by a portable data collection terminal may be stored in memory in the terminal for subsequent downloading to a database or the data may be transmitted to a central computer in real time using, for example, a cellular communications network or a spread spectrum network or a micro radio communications network.

An operator of a portable data collection terminal has to use one hand to hold the terminal even if the terminal is not being used to read a bar code. If the operator needs two hands to perform some other function, he or she must place the terminal in a safe place, perform the function and return to the terminal to pick it up. To avoid "tying up" one hand of the operator with the terminal, various proposals have been advanced for mounting the terminal to the operator's arm thereby leaving both hands free when the terminal is not being used to read a bar code dataform or input or process data using a keyboard or keypad on the terminal. Additionally, by mounting the terminal on the operator's arm, the terminal is readily available for reading a bar code dataform. The flexibility afforded by an arm mounted portable data collection terminal is especially beneficial in work environments where the operator needs both hands to move containers, hold open reference manuals, take notes on a clipboard, drive lift trucks or utility vehicles etc.

There are a number of concerns regarding the attachment of an arm mounted terminal to an operator's arm. First, a mounting assembly used to affix the terminal to the operator's arm should be ergonomically correct, that is, it should be comfortable and contoured to fit the shape of the user's arm. The arm mounting assembly should be adjustable to fit different sized arms. The terminal and mounting assembly must be well balanced on the operator's arm to minimize arm fatigue. The size of the terminal and the mounting assembly must permit the operator to bend his or her arm at the elbow and wrist. The terminal and mounting assembly should be adapted to be mounted on either the user's right or left arm. Furthermore, the mounting assembly should facilitate electrical connections between the terminal and any peripheral devices (e.g., a bar code label printer) carried by the operator.

Additionally, the portable terminal should be able to release or break free from the operator's arm in the event that the terminal is caught or impacted by a moving object such as a rotating or a pivoting piece of machinery so that the operator's arm is not pulled into the machinery and injured. On the other hand, the strength of attachment between the terminal and the operator's arm must be sufficient so that normal bumping and jarring of the terminal occurring as the operator moves about the workplace and performs other functions will not cause the terminal to accidentally release or break away from the operator's arm.

Two proposals have been advanced for mounting a terminal to an operator's arm. The first proposal includes strapping the terminal to the operator's arm with one or more bands similar to a watch band. Such a mounting assembly is disclosed in U.S. Pat. No. 5,305,181. Although this proposal provides a secure connection between the terminal and an operator's arm, it does not provide for the terminal releasing or breaking away from operator's arm.

A second proposed mounting assembly includes a sleeve which is placed over the operator's arm and secured in place. A VELCRO® hook and eye material strip is affixed to the sleeve. A mating VELCRO® hook and eye material strip is affixed to the back of the terminal. Pressing the two VELCRO® hook and eye material together secures the terminal to the sleeve. Although this proposed mounting assembly permits the terminal to break away from the sleeve and, therefore, the operator's arm, it is less than satisfactory because of the possibility of accidental break away. As the operator performs various functions requiring arm rotation, the sleeve may be twisted with respect to the portable terminal. As the sleeve twists, the two VELCRO® hook and eye material contacting surfaces may be partially separated. This reduces the VELCRO® hook and eye material contact area and, therefore, the strength of the attachment between the sleeve and the terminal. If the attachment strength is decreased below a minimum necessary to support the terminal weight, the terminal will break away from the sleeve and fall.

Accordingly, there is a need for a portable data collection terminal including an arm mounting assembly for securing the terminal to an operator's arm. The arm mounting assembly and terminal should be comfortable, well-balanced and adapted to be used on either the operator's left or right hand. In addition, the mounting assembly should permit the terminal to break away from the operator's arm if the terminal is impacted by a sufficient force which would cause injury to the operator if the terminal does not release from the operator's arm. At the same time, the mounting assembly should provide a secure enough attachment to the operator's arm to minimize the possibility of accidental break away of the terminal during the normal bumping and jarring that the terminal will be subjected to as the operator performs other functions and moves about the workplace.

SUMMARY OF THE INVENTION

It is an object of this invention to provide a portable data collection terminal including an arm mounting assembly which effectively secures the terminal to an operator's arm.

It is another object of this invention to provide a portable terminal including an arm mounting assembly permitting the terminal to break away from the operator's arm when impacted by a force sufficient to cause injury to the operator's arm if the terminal does not break away.

It is a further object of the invention to provide a portable terminal including an arm mounting assembly which is ergonomically correct and is suitable for left or fight handed use.

It is another object of this invention to provide a portable terminal including an arm mounting assembly facilitating electrical connection between terminal circuitry and a peripheral device.

In the preferred embodiment of the invention, a portable data collection terminal including an arm mounting assembly for releasably securing the terminal to an arm of the operator is provided. The arm mounting structure includes a low profile terminal receiving docking member and a flexible sleeve adapted to fit over the operator's arm. The docking member is configured to overlie a portion of the sleeve and is secured to the arm with flexible straps. The docking member is comprised of a durable, thin, rigid plastic material and defines a recess for receiving at least a portion of a bottom surface of a terminal housing. The portion of the terminal housing bottom portion received by the docking member is sized snugly fit in the docking member recess and by frictional force to releasably secure the terminal housing to the docking member.

The strength of attachment between the terminal and the docking member permits disengagement of the terminal from the docking member and, therefore, the operator's arm if a force sufficient to cause injury to the operator's arm is applied to the terminal. At the same time, the strength of attachment between the terminal and the docking member is sufficient to minimize the risk of accidental release of the terminal from the operator's arm due to normal jarring and bumping of the terminal that will normally be experienced as the operator performs other tasks and moves about the workplace.

The docking member of the portable data collection terminal of the present invention includes wiring channels and apertures and conductor receiving slots permitting electrical coupling of terminal input/output conductors exposed on the bottom of the terminal housing to a peripheral device. The terminal features a battery pack and bar code dataform reader module which are interchangeably connectable to opposite ends of the terminal housing. The interchangeability of the battery pack and the dataform reader module permit use of the terminal on either the operator's left or right arm.

A method of releasably securing the portable terminal of the present invention to the operator's arm is also disclosed. The steps of the method include: providing a docking member having a base and a wall extending from the base, the base and the wall defining a recess configured to permit at least a portion of a bottom surface of the terminal to snugly fit in the docking member recess, securing the docking member to a forearm of an operator, aligning the portion of the terminal bottom surface with the docking member recess, pressing the terminal toward the docking member to releasably secure the terminal to the docking member.

Other features and advantages will become apparent from the following description of the preferred embodiment, taken in conjunction with the accompanying drawings, which illustrate, by way of example, the principles of the invention.

DESCRIPTION OF THE PREFERRED EMBODIMENT

Figure 1:
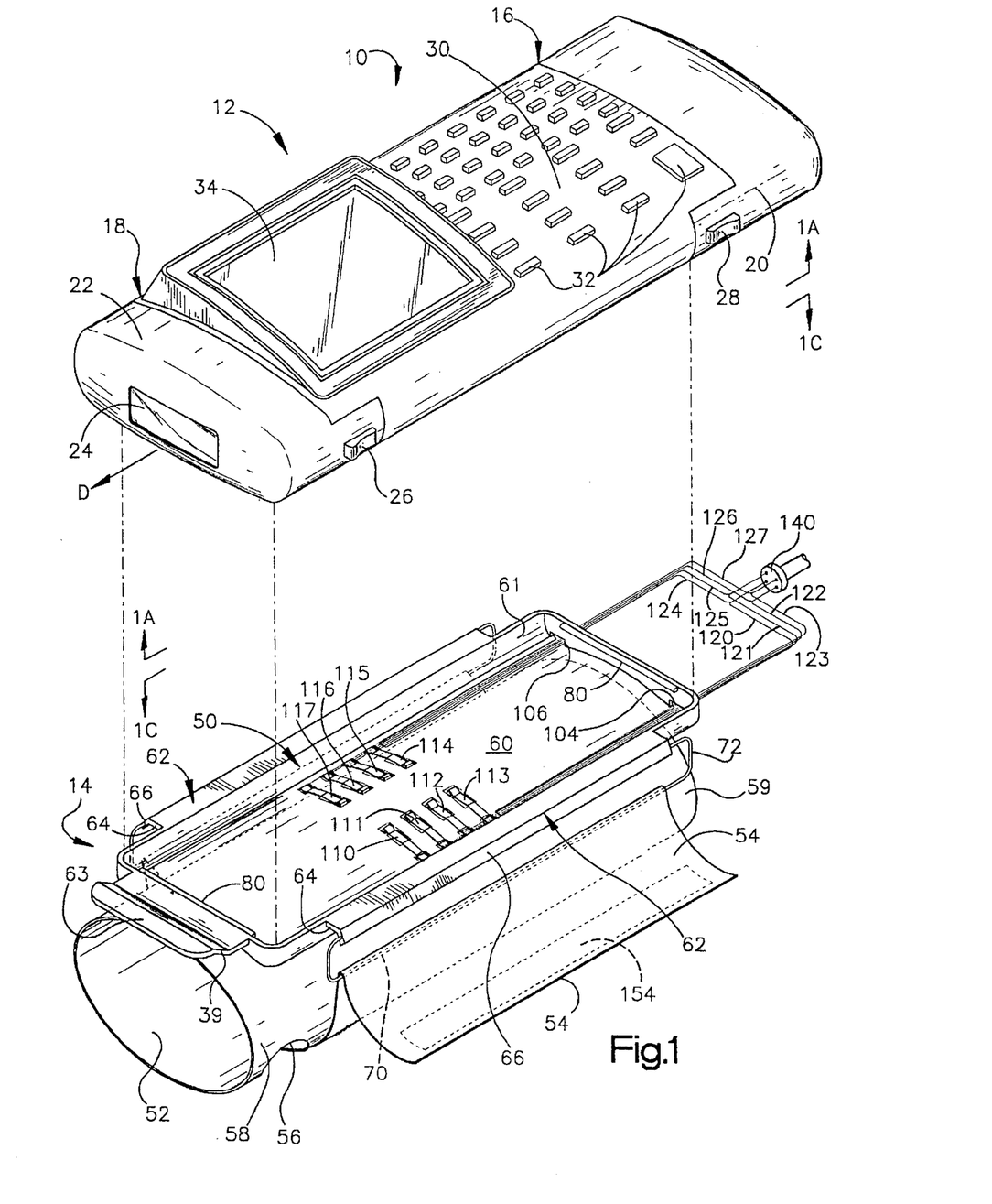
FIG. 1 is a perspective view of a portable data collection terminal including an arm mounting assembly of the present invention, a terminal housing detached from a docking member to illustrate electrical connectors positioned on the docking member upper surface.
Figure 2:
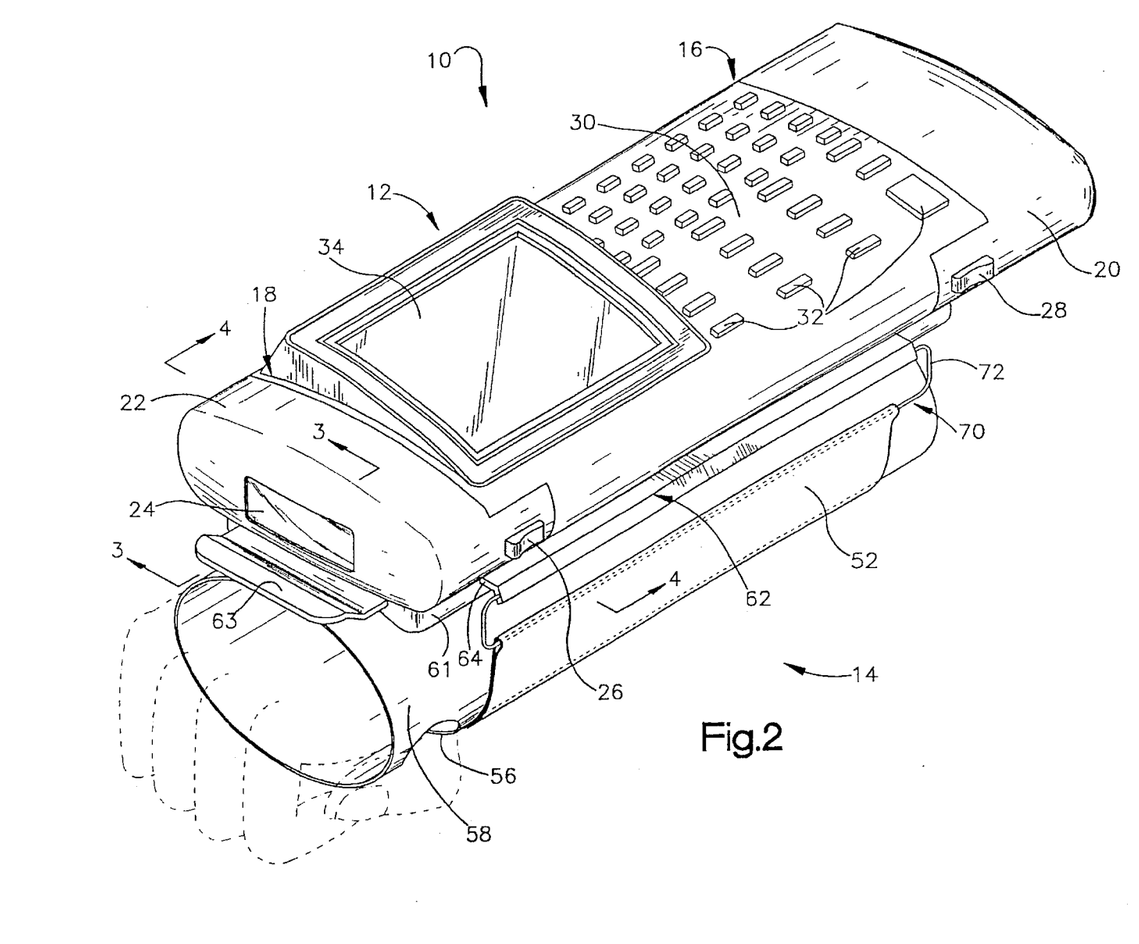
FIG. 2 is a perspective view of the portable data collection terminal of FIG. 1, the terminal housing being attached to the docking member.

Turning to the drawings, the portable data collection terminal including an arm mounting assembly is shown generally at 10 in FIGS. 1 and 2. The terminal 10 includes a terminal housing 12 and an arm mounting assembly 14. In FIG. 1, the terminal housing 12 is detached from the arm mounting assembly 14, while in FIG. 2, the housing 12 is attached to the arm mounting assembly 14.

Figure 1A:
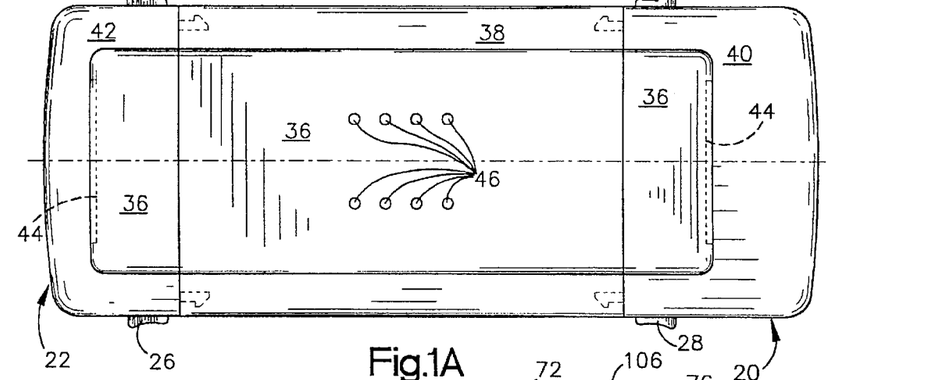
FIG. 1A is a bottom plan view of the terminal homing of FIG. 1 as seen from a plane indicated by line 1A—1A in FIG. 1.

The terminal housing 12 defines an interior region which supports circuitry of the terminal 10. Opposite ends 16, 18 of the terminal housing interchangeably accept one of a battery pack 20 and a dataform reader module 22. The battery pack 20 is electrically coupled to terminal circuitry through suitable interface connectors (not shown) to supply power to the circuitry. The reader module 22 is actuated to read a bar code dataform through a window 24 disposed at an end of the module. The window 24 is "aimed" at a target dataform (not shown) and the reader module 22 is actuated to read the target dataform along the direction D (FIG. 1). The reader module 22 may be a laser scanner, a charge coupled device (CCD) imaging reader or any other suitable dataform reading device. The reader module 22 is electrically coupled to the terminal circuitry by suitable connectors (not shown) to receive power and to send a signal representative of a read dataform to bar code decoding circuitry disposed in the housing 12. Since the battery pack 20 and the reader module 22 are interchangeable with respect to the homing ends 16, 18, the reader module 22 may be suitably mounted on the terminal housing 12 such that the window 24, and, therefore, the dataform reading direction D, is away from the operator's body when the terminal 10 is attached to either an operator's right forearm (shown in dashed lines in FIG. 2) or left forearm (not shown) and the operator extends his or her arm toward the target dataform. The reader module 22 includes two buttons 26 (best seen in FIG. 1A) which are simultaneously depressed to release the module from the terminal housing end 16 to which it is attached. Similarly, the battery pack 20 includes two buttons 28 (best seen in FIG. 1A) which are simultaneously depressed to release the battery pack from the terminal housing end 18.

Figure 3:
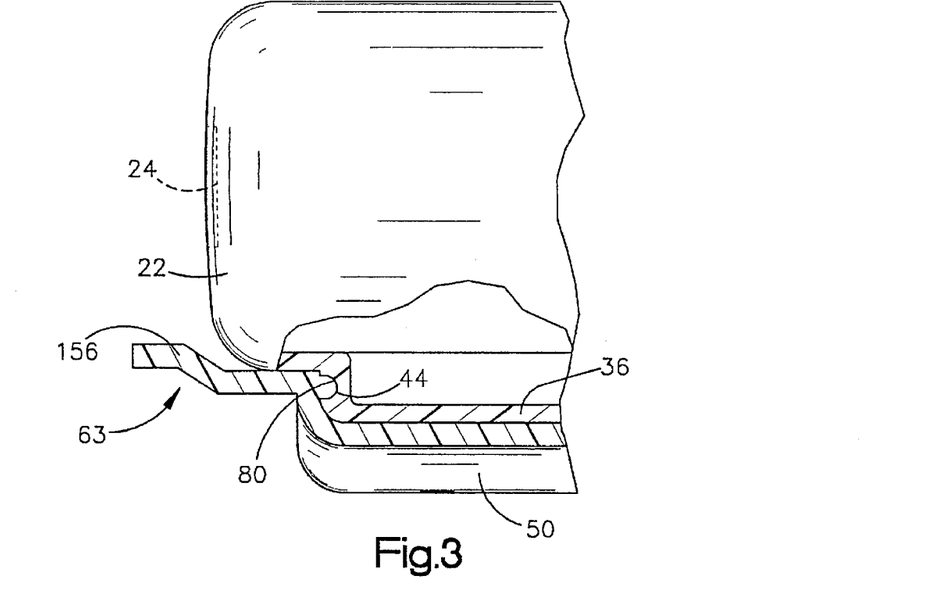
FIG. 3 is a fragmentary sectional view of the portable terminal of FIG. 1 as seen from a plane indicated by the line 3—3 in FIG. 2.

An upper surface 30 of the terminal housing 12 supports a plurality of keys 32 which are used for inputting data and providing commands to the terminal circuitry, including initiating a bar code dataform reading session with the reader module 22. The terminal housing upper surface 30 also supports a display 34 which is angled toward the operator's head (not shown) for better visibility. As can best be seen in FIG. 1A, a rectangular shaped protruding portion or docking base 36 is defined by extending portions from a lower surface 38 of the terminal housing 12, from a lower surface 40 of the battery pack 20 and from a lower surface 42 of the bar code dataform reader module 22. The protruding portion or docking base 36 includes indentations 44 (better seen in section in FIG. 3) whose function will be discussed below. Input/output conductive contacts 46 (one of which is also seen in FIG. 4A), which are flush with an outer surface of the protruding portion or docking base 36, are coupled to terminal electrical circuitry. The conductive contacts 46 provide for connection of input signals, output signals, power for recharging cells in the battery pack 20, and ground connections to a peripheral device, e.g., a bar code printer or battery charger (not shown).

The arm mounting assembly 14 includes a docking member 50, a flexible sleeve 52 and a flexible strap 54. The sleeve 52 is comprised of a resilient, durable rubber or other elastic material and provides a secure, non-slippery base for the docking member 50. The sleeve 52 serves several purposes including providing a non-slippery base for the docking member 50, protecting the operator's arm from the docking member and protecting the terminal housing 12 from vibration which would otherwise be transferred from the operator to the terminal housing. The sleeve 52 extends just shy of the operator's knuckles (shown in dashed lines in FIG. 2) and includes a thumb hole 56 which prevents the sleeve from rotating around the operator's forearm. The sleeve 52 is approximately one-eight inch thick and is cylindrical in shape. It is made of a hypo-allergenic elastic material and is sized to fit snugly around an operator's forearm. In order to allow a secure fit, the sleeve 52 is tapered such that a first end 58 of the sleeve (toward the operator's knuckles) has a circumference which is smaller then an opposite end 59 toward the operator's elbow. The tapered sleeve 52 conforms to the shape of the operator's forearm.

Figure 1B:
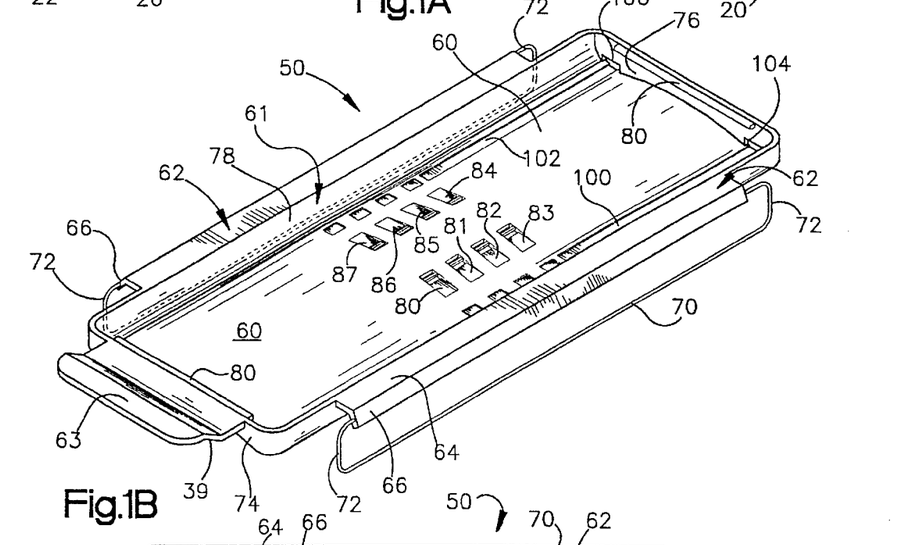
FIG. 1B is a perspective view of the docking member of FIG. 1 with the electrical connectors removed.
Figure 1C:
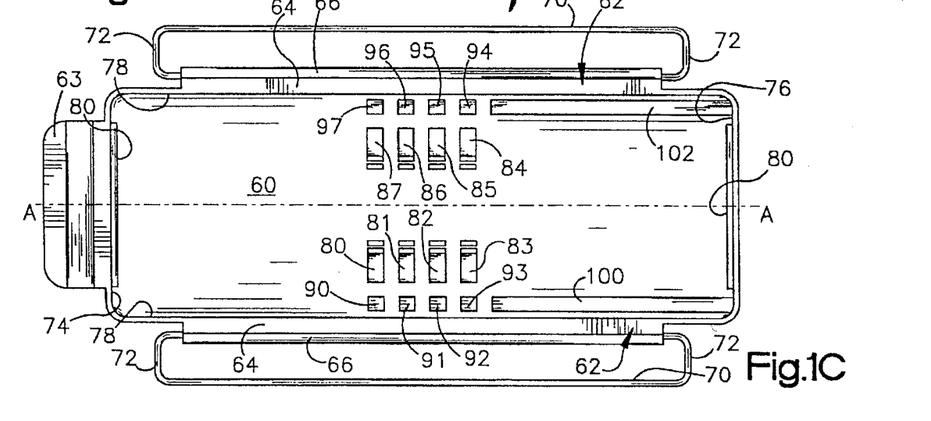
FIG. 1C is a top plan view of the docking member of FIG. 1 with the electrical connectors removed as seen from a plane indicated by line 1C—1C in FIG. 1.

As can best be seen in FIGS. 1B and 1C, the docking member 50 defines a recessed area into which the docking base 36 of the terminal housing 12 fits to secure the terminal housing to the docking member.

The docking member 50 is comprised of polypropolene providing rigidity and durability while also permitting a degree of flexibility. Of course, other materials having similar mechanical properties could also be used. The docking member 50 includes a base 60, a perimeter wall 61 extending upwardly from the base, flexible securing flaps 62 and a primary release tab 63. The base 50 has a low profile to minimize a distance it extends above the operator's forearm. Preferably, the perimeter wall 61 extends from the base 50 just less than 0.5 inches. The flexible securing flaps 62 each have a thin, outwardly extending flex portion 64 and a thicker downwardly extending portion 66. The outwardly extending flex portion 64 extends outwardly from the perimeter wall 61. The flex portions 64 allow the docking station 50 to better accommodate attachment to a variety of different operator forearm sizes.

Secured to each downwardly extending portion 66 is a support rod 70. The support rod 70 is comprised of stainless steel metal and each support rod has two hooked shaped ends 72 which are integrally molded into the downwardly extending portion 66. Each hooked shaped end 72 extends approximately one inch into the downwardly extending portion 645. The support rods 70 rotate with respect to the docking member 50 to provide additional adjustability for different size forearms.

The perimeter wall 61 includes a front section 74, a back section 76 and two side sections 78. The perimeter wall 61 and the base 60 form the recess which accepts the docking base 36 of the terminal housing 12. The front and back sections 74, 76 each include an extending lip 80 adjacent an upper surface of each which interfits with the corresponding indentations 44 in the bar code dataform reader module 22 and the battery pack 20.

To secure the terminal housing 12 to the to the docking member 50, the terminal housing docking base 36 is aligned with the recess of the docking member 50 then the terminal housing and docking member are pressed together. As the terminal housing docking base 36 seats against the base 60 of the docking member 50, the extending lips 80 snap into respective indentations 44 to secure the terminal housing 12 to the docking member 50.

The strength of the attachment between the terminal housing 12 and the docking member 50 is further enhanced by frictional holding forces resulting from the snug line to line geometric fit between an outer periphery of the docking base 36 and an inner surface of the docking member perimeter wall 61. The strength of the attachment between the terminal homing 12 and the docking member 50 is great enough to avoid accidental disengagement resulting from normal jarring and bumping that occur in the workplace. On the other hand; if a force sufficient to harm the operator's arm impacts the terminal housing 12, the strength of attachment is small enough to permit the terminal housing to release.

Although the preferred embodiment of the portable terminal 10 includes having the lips 80 extending from the front and back sections 74, 76 of the perimeter wall 61, it should be appreciated that the perimeter wall could alternately be configured to have lips extending from the two side sections 78 or extending from one side section 78 and the front section 74, etc. Of course, the mating indentations 44 would have to be appropriately relocated on the docking base 36 to be aligned with and receive the extending lips wherever they may be positioned.

Figure 4:
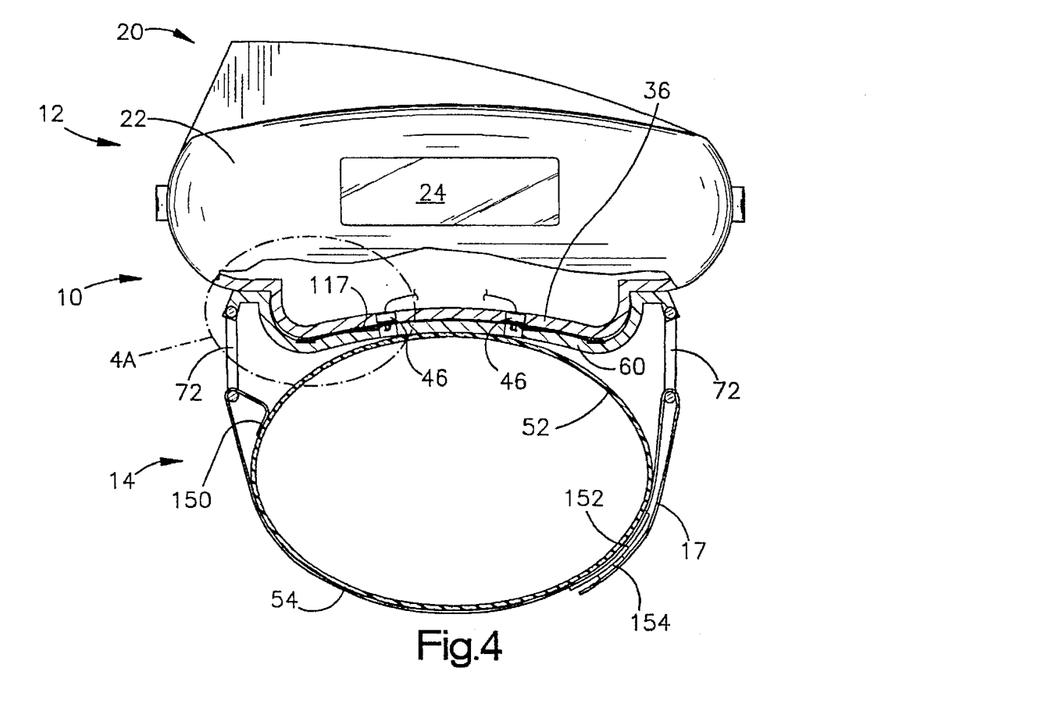
FIG. 4 is a view partly in section of the portable terminal of FIG. 1 as seen from a plane indicated by the line 4—4 in FIG. 2.
Figure 4A:
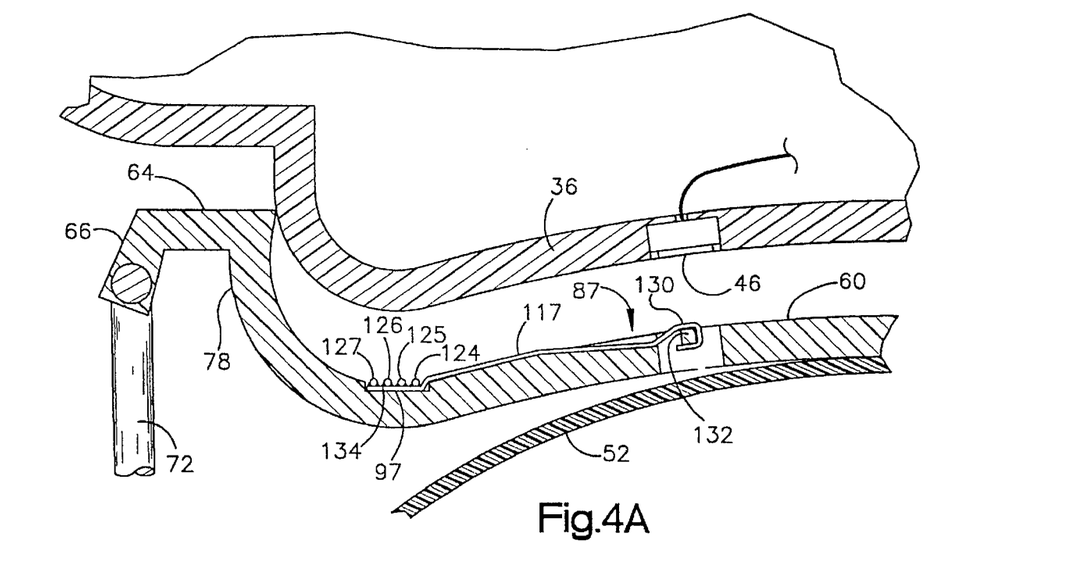
FIG. 4A is an enlarged fragmentary sectional view of a portion of FIG. 4 encircled and labeled 4A with the terminal housing and docking member slightly detached to better illustrate the attachment of one of the electrical connectors to the docking member.

As can best be seen in FIG. 4, the base 60 of the docking member 50 is shaped to comfortably fit a curved shape of the operator's forearm. Particularly, the base 60 is curved along a longitudinal axis A—A (FIG. 1C) with a radius of curvature of six inches.

Referring to FIGS. 1B and 1C, the base 60 of the docking member 50 includes eight electrical connector receiving slots 80, 81, 82, 83, 84, 85, 86, 87. Aligned with and located outwardly of the electrical connector receiving slots 80–87 are recesses 90–97. Extending along the upper surface of the base 60 adjacent the side wall sections 78 are two indentation channels. The channels 100, 102 terminate in openings 104, 106 in the back section 76 of the peripheral wall 61. FIG. 4A provides a cross sectional view of one of the electrical connector receiving slots 87 and the corresponding recess 97.

As can be seen in FIG. 1, eight conductors 110, 111, 112, 113, 114, 115, 116, 117 and eight conductive wires 120, 121, 122, 123, 124, 125, 126, 127, each of which is soldered to a corresponding one of the conductors, provide electrical coupling between the terminal housing conductors 46 of the terminal housing 12 and an external peripheral device (not shown).

As can best be seen in FIG. 4A, each of the conductors 110–117 has a hook-shaped end 130 which hooks over a small cross member 132 of its corresponding connector receiving slot 80-87. As can best be seen in FIG. 4, when the terminal housing docking member 36 is fully inserted in the docking member recess, each of the terminal housing conductors 46 contacts a portion of the hook shaped distal end 130 of its respective aligned conductor 110–117. Turning again to FIG. 4A, each of the conductors 110–117 additionally includes a flat portion 134 at an end opposite the hook shaped end 130. The flat portion 134 of each conductor 110–117 fits into a corresponding recess 90–97.

In this particular embodiment of the portable terminal 10, the four connectors 110, 111, 112, 113 are used to handle a transmit, receive, ground and battery charging signals respectively. In order to allow for left or right handed use of the terminal 10, opposite cornered connectors 110-117 are electrically coupled together, that is, connector 110 is electrically coupled to connector 114, connector 111 is electrically coupled to connector 115, connector 112 is electrically coupled to connector 116, and connector 113 is electrically coupled to connector 117. These opposite cornered couplings are accomplished by connecting appropriate pairs of conductive wires in an external connector 140. That is, wires 120 and 124 are coupled electrically at the external connector 140 to couple connectors 110–114 (FIG. 1). Wires 121 and 125 are electrically coupled at the external connector 140 to couple connectors 111, 115. Wires 122 and 126 are electrically coupled at the external connector 140 to couple connectors 112, 116. Finally, wires 123 and 125 are electrically coupled at the external connector 140 to couple connectors 113, 117. The wires 120–123 are disposed in the indentation channel 100 and pass from the docking member 50 through the opening 104. The wires 124–127 are disposed in the indentation channel 102 and pass from the docking member 50 through the opening 106.

It should be appreciated, however, that this is but one design for electrical connections. Other designs having different connections and/or a different number of electrical connector slots could readily be used.

Referring to FIGS. 1 and 2, the strap 54 secures the docking member 50 to the sleeve 52. The strap 54 is approximately nine inches long and approximately five inches wide (just less than the width of the rods 70). The strap 54 is attached at one end 150 to the sleeve 52 by sewing. As best seen in FIG. 4, two strips 152, 154 of VELCRO® hook and eye material are affixed to the strap 54 to provide an adjustable fastening mechanism.

In operation, the operator initially positions the sleeve 52 along his or her arm such that the tapered end 58 is closest to his or her knuckles. Further, the operator's thumb is inserted into the thumb slot 56. Next, the operator positions the docking member 50 onto the sleeve 52 such that the primary release tab 63 is pointing toward his or her knuckles. The primary release tab 63 is positioned in this direction to avoid inadvertent disengagement of the terminal housing 12 from the docking member 50 during arm movements. Such disengagement may occur if the primary release tab 63 is positioned toward the operator's elbow. Once the docking member 50 is situated properly on the sleeve 52, the strap 54 is looped around the support rod 70 and the two strips VELCRO® hook and eye material 152, 154 are pressed together to achieve a secure yet comfortable fit. Finally, the terminal housing 12 is aligned with the docking member 50 such that the dataform reader module 22 is facing the operator's knuckles and the terminal housing docking base 36 is aligned with the recess of the docking member 50. Pressure is then applied to the terminal housing 12 to insert the docking base 36 into the terminal housing recess, as described earlier, thereby securing the terminal housing 12 to the arm mounting assembly 14.

To disengage the terminal housing 12 from the docking member 50 the primary release tab 63 is grasped and pushed downwardly away from the terminal housing thereby disengaging the terminal housing from the docking member. The primary release tab 63 has an angularly shaped distal portion 156 (FIG. 3) which facilitates grasping the primary release tab 63 when disengaging the terminal housing 12 from the docking member 50.

Figure 5:
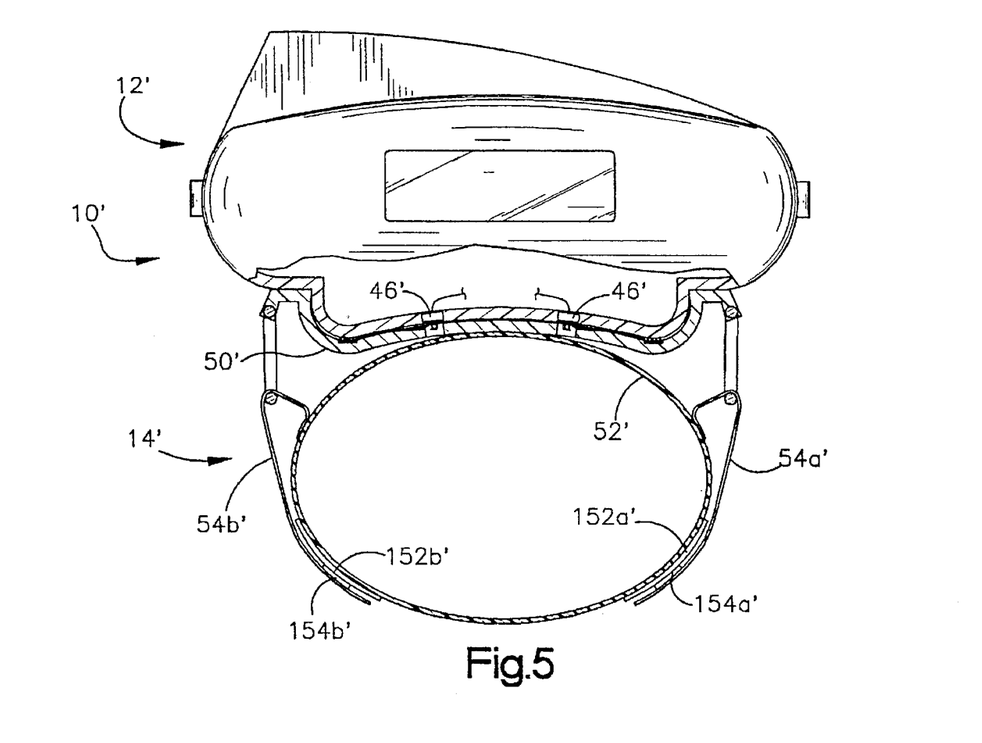
FIG. 5 is a view partly in section of an alternate embodiment of the portable data collection terminal including arm mounting assembly of the present invention.

An alternate embodiment of the portable data terminal of the present invention is shown generally at 10' in FIG. 5. The terminal 10' includes a terminal housing 12' and an arm mounting assembly 14'. The difference between the two terminal embodiments 10 and 10' is that in the second terminal embodiment 10', two straps 54a', 54b', each of which is affixed at one end by sewing to a sleeve 52', are utilized to secure the docking member 50' to the sleeve 52'. Two VELCRO® hook and eye material strips 152a', 152b' are affixed to the sleeve 52', Additionally, each strap 54a', 54b' has a VELCRO® hook and eye material strip 154a', 154b' affixed near an end of the strap opposite of the end affixed to the sleeve 52'. The VELCRO® hook and eye material strips 152a', 154a' are pressed together and the VELCRO® strips 152b', 154b' are pressed together to secure the docking member 50' to the sleeve 52'.

Figure 6:
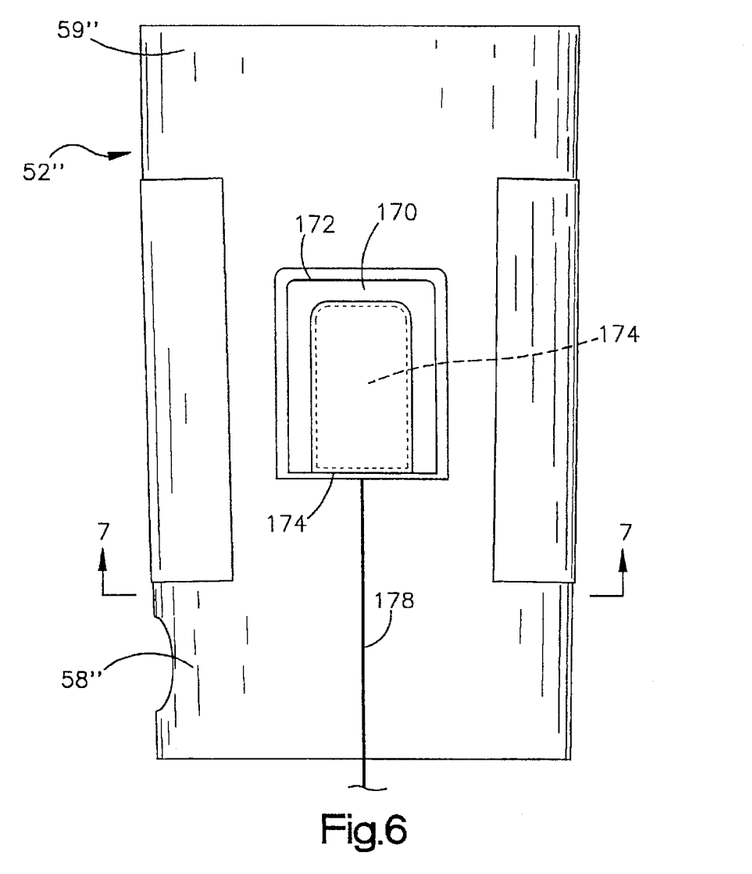
FIG. 6 is a bottom plan view of an alternate embodiment of an elastic sleeve of the arm mounting assembly of the present invention.
Figure 7:
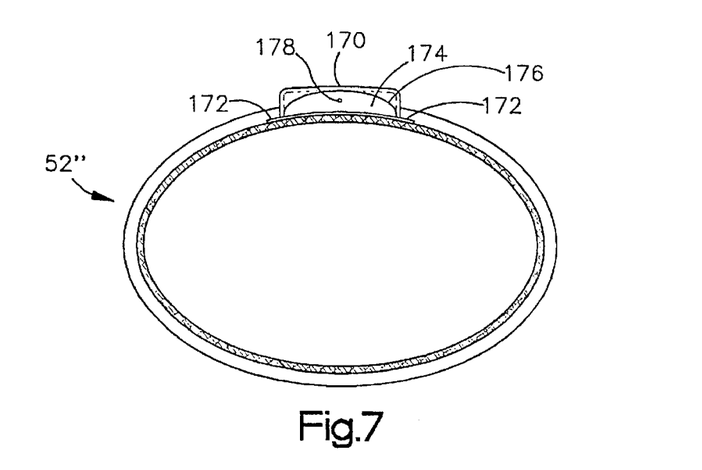
FIG. 7 is a sectional view of the elastic sleeve of FIG. 6 as seen from a plane indicated by the line 7—7 in FIG. 6.

Yet another embodiment of an elastic sleeve of the portable data terminal 10' of the present invention is shown generally at 52" in FIGS. 6 and 7. Affixed to an outer surface of the sleeve approximately halfway between first and second ends 58", 59" of the sleeve is a pouch 170. The pouch 170 is sewn to the sleeve 52 on three sides along a line 172 and is sized to receive a low profile battery pack 174 which is slid into the pouch's one open side. The open side of the pouch 170 includes an elastic strip 176 which partially encloses the battery pack 174 to prevent the battery pack from falling out of the pouch during arm movement by the operator. The docking member (not shown) overlies a side of the sleeve 52" opposite the side that the pouch 170 is affixed to. The battery pack 174 is electrically coupled to the connector 140 (not shown) by a conductive wire 178. The battery pack 174 may be supplemental to the battery pack 20 which provided power electric circuitry of the terminal 12. Alternately, the battery pack 174 may be used in place of the battery pack 20 thereby enabling the overall size of the terminal 12 to be decreased appropriately. Further, additional pouches (not shown) and battery packs (not shown) may be added to the sleeve 52" and the battery packs electrically coupled together to provide additional power if required by the terminal circuitry or to extend time between recharging.

Another peripheral device that may advantageously be employed in conjunction with the portable terminal 10 is a small hand held triggering device (not shown) which would be held in the operator's hand and electrically coupled to the connector 140. The operator would engage the trigger, for example, by depressing a trigger button, to actuate the bar code dataform reader module to commerce reading a dataform. Normally, the triggering device would be held in the hand corresponding the arm the terminal 10 is mounted on.

Although the invention has been described in its preferred form with a certain degree of particularity, it is understood that the present disclosure of the preferred form has been made only by way of example and that numerous changes in the details of construction, operation and combination and arrangement of parts may be resorted to without departing from the spirit and the scope of the invention.

I claim:

1. A portable terminal including an arm mounting assembly comprising:
   a) a terminal docking member adapted to be secured to a forearm of an operator, the docking member including a base and a wall extending upwardly from the base, the base and wall defining a recess; and
   b) the terminal including a terminal housing having a bottom surface, at least a portion of the bottom surface sized to snugly fit in the docking member recess and by frictional force to releasably secure the terminal housing to the docking member, the terminal housing including a protruding portion extending outwardly from the bottom surface which is sized to snap fit into the docking member recess; and
   c) a flexible attachment member attached to the terminal docking member to secure the terminal docking member to the forearm of the operator.

2. The portable terminal of claim 1 wherein the potion of the terminal housing bottom surface sized to snugly fit in the docking member recess has a line to line geometric fit with an inner surface of the docking member wall.

3. The portable terminal of claim 1 wherein the wall of the docking member is less than 1 inch in height above the base.

4. The portable terminal of claim 1 wherein the arm mounting assembly further includes an elastic sleeve adapted to be worn over a portion of an operator's forearm, an outer surface of the sleeve providing a reduced slip support surface for a bottom surface of the docking member when the docking member is secured to the operator's forearm.

5. The portable terminal of claim 4 wherein the elastic sleeve is tapered at one end and further wherein the attachment member includes a strap affixed to the sleeve and looped around a portion of the docking member to secure the docking member to the elastic sleeve.

6. A portable terminal including an arm mounting assembly comprising:
   a) a terminal docking member adapted to be secured to a forearm of an operator, the docking member including a base and a wall extending upwardly from the wall, the base and wall defining a recess;
   b) the terminal including a terminal housing having a bottom surface, at least a portion of the bottom surface sized to snugly fit in the docking member recess and by frictional force to releasably secure the terminal housing to the docking member, the terminal housing having a protruding portion extending outwardly from the bottom surface which is sized to snap fit into the docking member recess, the protruding portion including an indentation; and
   c) the docking member wall including an extending lip sized to fit into the terminal housing indentation to secure the terminal housing to the docking member when the protruding potion is inserted into the docking member recess.

7. A portable terminal including an arm mounting assembly comprising:
   a) a terminal docking member adapted to be secured to a forearm of an operator, the docking member including a base and a wall extending upwardly from the wall, the base and wall defining a recess and including an indentation;
   b) the terminal including a terminal housing having a bottom surface, at least a portion of the bottom surface sized to snugly fit in the docking member recess and by frictional force to releasably secure the terminal housing to the docking member, the terminal housing having a protruding portion extending outwardly from the bottom surface which is sized to snap fit into the docking member recess, the protruding portion of the terminal housing includes an extending lip sized to fit into the terminal housing indentation to secure the terminal housing to the docking member when the protruding portion is inserted into the docking member recess.

8. A portable terminal including an arm mounting assembly comprising:
   a) a terminal docking member adapted to be secured to a forearm of an operator, the docking member including a base and a wall extending upwardly from the wall, the base and wall defining a recess;
   b) the terminal including a terminal housing having a bottom surface, at least a portion of the bottom surface sized to snugly fit in the docking member recess and by fictional force to releasably secure the terminal housing to the docking member;
   c) a flexible attachment member attached to the terminal docking member to secure the terminal docking member to the forearm of the operator;
   d) an elastic sleeve adapted to be worn over a portion of an operator's forearm, an outer surface of the sleeve providing a reduced slip support surface for a bottom surface of the docking member when the docking member is secured to an operator's forearm, the elastic sleeve including a pouch affixed to an outer surface of the sleeve, the pouch adapted to receive a battery pack which is electrically coupled to the terminal to provide power to circuitry supported in the terminal housing, the battery being electrically coupled to a docking member connector supported in a terminal facing upper surface of the base of the docking member and the docking member connector contacting a terminal connector protruding from the bottom surface of the terminal housing when the terminal is secured in the docking member.

9. A portable terminal including an assembly for mounting the terminal to an arm of an operator, the terminal comprising:
   a) the terminal including a terminal housing having a docking portion extending from at least a portion of a lower surface of the housing, the docking portion including an indentation;
   b) the assembly including a docking member defining a recess configured to receive the docking portion of the terminal housing, the docking member including a extension which snap fits into the terminal housing docking portion indentation to releasably secure the terminal housing to the docking member; and
   c) an attachment member to secure the docking member to a forearm of an operator.

10. The portable terminal of claim 9 wherein assembly further includes an elasticized sleeve adapted to fit over a forearm of the operator thereby providing a support surface for the docking member when the docking member is secured to a forearm of an operator.

11. The portable terminal of claim 9 wherein the attachment member includes at least one adjustable strap.

12. The portable terminal of claim 9 wherein:
   a) the terminal housing docking portion includes an opening supporting an electrical contact coupled to circuitry supported in the terminal housing; and b) the docking member includes at least one conductor supported on an upper surface of a base of the docking member and positioned to contact the electrical contact of the terminal housing docking portion when the docking portion is inserted into the docking member recess coupling circuitry in the terminal housing to a remote device.

13. The portable terminal of claim 12 wherein the conductor is secured to an indentation in the docking member base.

14. The portable terminal of claim 9 wherein the docking member includes an inwardly curved bottom surface along a longitudinal axis of the member to conform to a generally cylindrically shape of a forearm of an operator.

15. A portable terminal including an arm mounting assembly comprising:
   a) a terminal docking member adapted to be secured to a forearm of an operator, the docking member including a base and a wall extending upwardly from the base, the base and wall defining a recess;
   b) the terminal including a terminal housing having a bottom surface, at least a potion of the bottom surface sized to snugly fit in the docking member recess and by frictional force to releasably secure the terminal housing to the docking member; and
   c) a flexible attachment member attached to the terminal docking member to secure the terminal docking member to the forearm of the operator; and
   d) the bottom surface of the terminal housing supporting a set of connectors electrically coupled to electrical circuitry in the terminal housing and a terminal facing upper surface of the docking member base supporting a set of connectors which contact the set of connectors supported by the terminal housing when the terminal is secured in the docking member, each connector in the set of docking station connectors being coupled to a respective conductive wire, each conductive wire extending through an opening in the docking member.

\* \* \* \* \*